United States Patent [19]

Lebrun et al.

[11] Patent Number: 4,861,844

[45] Date of Patent: Aug. 29, 1989

[54] CATIONIC CATALYSIS PROCESS FOR THE TREATMENT OF A POLYSILAZANE CONTAINING ON AVERAGE AT LEAST TWO ≡SIH GROUPS PER MOLECULE

[75] Inventors: Jean-Jacques Lebrun, Caluire; Hugues Porte, Lyon, both of France

[73] Assignee: Rhone-Poulenc Specialites Chimiques, Courbevoie, France

[21] Appl. No.: 161,397

[22] Filed: Feb. 22, 1988

Related U.S. Application Data

[63] Continuation of Ser. No. 878,281, Jun. 25, 1986, abandoned.

[30] Foreign Application Priority Data

Jun. 26, 1985 [FR] France ............................. 85 10033

[51] Int. Cl.$^4$ .................... C08G 77/08; C08G 77/06
[52] U.S. Cl. .................................... 525/475; 525/474; 528/12; 528/15; 528/19; 528/21; 528/23; 528/25; 528/26; 528/28
[58] Field of Search ................. 525/474, 475; 528/12, 528/15, 19, 21, 23, 25, 26, 28

[56] References Cited

U.S. PATENT DOCUMENTS 3,007,886 11/1961 Parker .
3,187,030 6/1965 Boyer et al. .
3,853,567 12/1974 Verbeek .
4,482,689 11/1984 Haluska .
4,656,300 4/1987 Lebrun et al. ........................ 528/28
4,689,252 8/1987 Lebrun et al. ........................ 528/15
4,689,382 8/1987 Lebrun et al. ...................... 525/474
4,694,060 9/1987 Porte et al. ......................... 525/474
4,722,988 2/1988 Porte et al. ........................... 528/28

FOREIGN PATENT DOCUMENTS 0146802 11/1984 European Pat. Off. .
1205698 2/1963 Fed. Rep. of Germany .

OTHER PUBLICATIONS

VanderWerf, Acids, Bases and the Chemistry of the Covalent Bond, 1961, p. 71.
EPO Search Report, EP 86 42 0162, dated 9/30/86.

Primary Examiner—John C. Bleutge
Assistant Examiner—David W. Woodward
Attorney, Agent, or Firm—Burns, Doane, Swecker & Mathis

[57] ABSTRACT

A process for the catalytic treatment of a polysilazane containing an average of at least two, preferably at least three, ≡SiH groups per molecule with a catalytically effective quantity of a strong inorganic or organic acid catalyst. The other organic radicals in the polysilazane that are bonded to the silicon or nitrogen atoms are hydrocarbon radicals free from alkene or alkyne unsaturations. The polysilazanes treated in this manner can be characterized by good thermal behavior and can be used, in particular, as precursors of ceramic products with a high yield of inorganic products.

19 Claims, No Drawings

CATIONIC CATALYSIS PROCESS FOR THE TREATMENT OF A POLYSILAZANE CONTAINING ON AVERAGE AT LEAST TWO ≡SiH GROUPS PER MOLECULE

This application is a continuation, of application Ser. No. 878,281, filed June 25, 1986, now abandoned.

BACKGROUND OF THE INVENTION

The present invention relates to cationic catalysts for the treatment of a polysilazane and, more particularly, to a cationic catalysis process for the treatment of a polysilazane containing on average at least two ≡SiH groups per molecule.

Organopolysilazanes, referred to as polysilazanes hereinafter, are well-known products that occur in the form of monomers, oligomers, ring or linear polymers, and resinous polymers. These polysilazanes an be prepared using a wide variety of methods from a wide range of starting materials.

Particularly, these polysilazanes can be shaped and pyrolyzed in the form of $Si_3N_4$, SiC or their mixtures. The silicon nitride can also be manufactured by reacting chlorosilanes, such as $SiCl_4$, $HSiCl_3$, and $H_2SiCl_2$, with ammonia at a high temperature and in a vapor phase. It is difficult to manufacture shaped articles, especially fibers, because this method directly yields a powered product. In contrast, polysilazanes can also be spun into continuous fibers that yield ceramic fibers upon pyrolysis.

The polysilazanes can be shaped into films of various gauges and massive molded articles. They can also be used as a binder for ceramic fiber or carbon fiber and as a sintering binder for porous ceramic articles.

However, difficulties are encountered in converting these polysilazanes readily and economically into the form of fibers or coatings that, after pyrolysis, yield ceramic products in the form of fibers, films, coatings of various gauges and molded articles. One attempt to solve this problem is provided in U.S. Pat. No. 3,853,567. This patent discloses a process that manufactures shaped articles, such as fibers, comprising silicon carbide, silicon nitride or mixtures thereof, and other ceramic products. The process carries out a first thermal treatment of a polysilazane at a temperature between 200° C. and 800° C. to obtain a meltable carbosilazane resin that can be melt-spun and then pyrolyzed at a temperature between 800° C. and 2000° C.

Although the process of this patent represents a significant step forward, it has two disadvantages. Namely, it requires a first thermal treatment at a temperature that is very high, such as 200°-800° C. The process also requires the carbosilazane to be in melt form under anhydrous conditions and in an inert atmosphere. The weight yield of ceramic from this process is typically inadequate.

Japanese Patent Application No. 77/160,446 describes a process for the polymerization of an organopolysilazane of high molecular weight by using acidic earths as a catalyst for the treatment of the organopolysilazane. However, in this process, the solid catalyst needs to be separated off by filtration. This separation involves the use of a solvent in the case of polymers that can reach high viscosities. Furthermore, the process of this Japanese Patent rules out the use of polysilazanes containing ≡SiH groups but does not rule out the possibility of using polysilazanes containing unsaturated aliphatic hydrocarbon groups bonded to silicon atoms. These aliphatic hydrocarbon groups include alkenyl groups, for example vinyl or allyl.

U.S. Pat. No. 3,007,886 describes a process for the treatment of polysilazanes with metal salts of monocarboxylic acids that are soluble in hydrocarbon solvents. U.S. Pat. No. 3,187,030 describes a process for the treatment of polysilazanes with specific metal salts of strong inorganic acids. In this process, the catalytic activity is ensured by the metal cations that act as a Lewis acid.

SUMMARY OF THE INVENTION

The purpose of the present invention is to solve the above problems and provide a simple, effective, economical and readily usable means for preparing polysilazanes that, when pyrolyzed at a temperature from about 1000° C. to 2000° C., yield ceramic products of excellent properties. The ceramic properties can be in a wide variety of form such as filaments, molded articles, coatings, films, and the like.

Moreover, it is also desirable to have readily available a polysilazane that is sufficiently stable to hydrolysis and that yield a ceramic material in a high weight yield when pyrolyzed. For this purpose, it is intended that the polysilazane exhibits good thermal behavior during pyrolysis, while remaining integrally attached to the substrate to be coated and impregnated.

These and other objectives are obtained by the present invention that provides a process for the treatment of a polysilazane. The process treats catalytically at least one polysilazane with a catalytically effective quantity of a strong acid catalyst. The polysilazane contains on average at least two ≡SiH groups per molecule. The other organic radicals that are bonded to the silicon or nitrogen atoms are hydrocarbon radicals free from alkene or alkyne unsaturations. Preferably, the polysilazane has at least three ≡SiH groups per molecule. The strong acid catalyst is an inorganic or organic acid.

The above and other features and advantages of the present invention will be made more apparent from the following description of the preferred embodiment.

DETAILED DESCRIPTION OF THE PREFERRED EMBODIMENT

In accordance with the present invention, the present process catalytically treats at least one polysilazane with a catalytically effective quantity of a strong inorganic or organic acid catalyst. The starting polysilazane used for carrying out the process of the invention contains at least two, preferably at least three, ≡SiH groups per molecule. The other organic radicals that are bonded to the silicon or nitrogen atoms are hydrocarbon radicals free from alkene or alkyne unsaturations.

The polysilazane groups are preferably chosen from the groups of formulae (Ia), (Ib) and (Ic):

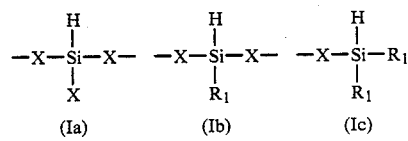

In formulae Ia, Ib, and Ic, the radicals $R_1$, which may be identical or different, are chosen from a hydrogen atom, a saturated aliphatic hydrocarbon radical, and an aryl, alkylaryl or arylalkyl radical. The chain members X, which may be identical or different, are selected from (CH$_2$)n with n being an integer from 1 to 8, —Si—, and N—. Preferably, at least 50% of the X substituents are N—.

As the starting polysilazane, groups other than (Ia), (Ib) and (Ic) may be chosen from formulae (IIa), (IIb), (IIc) and (IId):

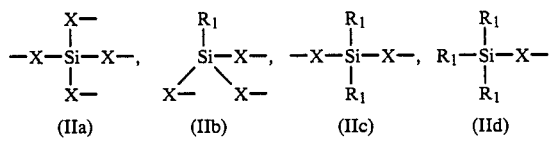

(IIa)   (IIb)   (IIc)   (IId)

In formulae IIa, IIb, IIc, and IId, the radicals R$_1$, which may be the same or different, have the meaning given above for formulae Ia, Ib, and Ic. The chain members X, which may be identical or different, are selected from (CH$_2$)n with n being an integer from 1 to 8, —Si— and N—. Preferably, at least 50% of the X substituents are N—.

In the formulae (Ib), (Ic), (IIb), (IIc) and (IId), the radical R$_1$ may be a saturated aliphatic hydrocarbon radical, preferably containing from 1 to 8 carbon atoms, such as methyl, ethyl, propyl, butyl, pentyl, hexyl, heptyl and octyl radical. The radical R$_1$ may also be a saturated cyclic hydrocarbon radical containing from 3 to 7 carbon atoms, such as the cyclopropyl, cyclobutyl, cyclopentyl, cyclohexyl and cycloheptyl radical. The R$_1$ radical may also be an arylalkyl radical such as the benzyl and phenylethyl radicals, or an alkylaryl radical such as the tolyl and xylyl radicals. Methyl and phenyl radicals are the preferred radicals.

Preferably, in the above formulae, X is chosen from N— and —Si—.

The above polysilazanes are well-known products that are described in detail in the literature. For example, the polysilazanes may be obtained as a product of the reaction of at least one organohalomonosilane of the formula:

$$R_aY_{4-a}Si$$

with an organic or organosilicon compound containing at least one NH$_2$ or NH group. In the above formula, Y is a halogen, such as chlorine; the radicals R, which may be identical or different, may have the above definition of R$_1$ or may denote the hydrogen atom; and a is an integer from 0 to 3 inclusive. The organic or organosilicon compound may be, for example, ammonia, primary or secondary amines, silylamines, amides, hydrazines, hydrazides, and the like.

Examples of organohalosilanes that can be used either alone or in combination in the preparation of the polysilazane include:
(CH$_3$)$_2$SiCl$_2$, (CH$_3$)$_3$SiCl, CH$_3$SiCl$_3$, SiCl$_4$,
(C$_6$H$_5$)$_2$SiCl$_2$, (C$_6$H$_5$) (CH$_3$)SiCl$_2$, C$_6$H$_5$SiCl$_3$,
(CH$_3$) (CH$_3$CH$_2$)SiCl$_2$,
CH$_3$HSiCl$_2$, H$_2$SiCl$_2$, (CH$_3$)$_2$HSiCl, and HSiCl$_3$.

The following are examples of organic or organosilicon compounds containing at least one NH$_2$ or NH group that can be used in the synthesis of the above polysilazanes: ammonia, methylamine, ethylamine, cyclopropylamine, hydrazine, methyl-hydrazine, ethylenediamine, tetramethylenediamine, hexamethylenediamine, aniline, methylaniline, diphenylamine, toluidine, guanidine, aminoguanidine, urea, hexamethyldisilazane, diphenyl-tetramethyldisilazane, tetraphenyldimethyldisilazane, tetramethyldivinyldisilazane, dimethyldiphenyldivinyldisilazane and tetramethyldisilazane.

The starting polysilazanes prepared from ammonia are generally referred to as ammonolysates and the starting polysilazanes prepared from an amino compound, as indicated above, are generally referred to as aminolysates, which also include the ammonolysates. More particularly, the starting polysilazanes containing units of formula (Ib) may be produced by coammonolysis of the following silanes: CH$_3$SiCl$_3$, (CH$_3$)$_2$SiCl$_2$ and CH$_3$HSiCl$_2$.

Cyclic or linear polysilazanes of the formula:

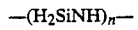

may be used as a polysilazane containing units of formula (Ib) and in which R$_1$=H. The preparation of these cyclic or linear polysilazanes is described in detail in U.S. Pat. No. 4,397,828.

As a cyclic or linear polysilazane containing units of formula (Ib) in which R$_1$ is other than a hydrogen atom, there may be used polysilazanes of the formula:

In the above formula, n is a number greater than or equal to 3 and is generally from 3 to 100. The preparation of these polysilazanes by ammonolysis of R$_1$SiHCl$_2$ is described in detail by S. D. Brower and C. P. Haber, 70 *J. Am. Chem. Soc.* 3888–91 (1948); K. A. Andrianov et al., 176 *Dokl. Akad. Nauk SSSR* 85 (1967); British Pat. No. GB-A 881,178; and U.S. Pat. No. 4,482,669.

The polysilazanes may be resinous polymers consisting of units chosen from those of the formulae: R$_3$SiNH$_{0.5}$, R$_2$SiNH, RSiNH$_{1.5}$, and Si(NH)$_2$. In these formulae, R has the meaning given above for R$_1$. These resinous polymers are advantageously prepared by bringing the corresponding organochlorosilanes or mixtures of these silanes into contact with ammonia in an organic solvent medium, if appropriate. For example, see French Pat. Nos. FR-A 1,379,243, 1,392,853 and 1,393,728.

These resinous polysilazanes contain a predominant number of Si-NH-Si bonds and a smaller number of SiNH$_2$ or N(Si)$_3$ bonds. In addition to the cross-linked polymers, these polysilazanes sometime contain linear or cyclic polymers with the latter being capable of being produced only when diorganodichlorosilanes are also present among the starting organochlorosilanes.

In the aminolysates, the concept of functionality is transposed by defining a functionality f$^N$=1 contributed by an Si-N bond. Thus, the following units are distinguished in the aminolysates of the polysilazane type:

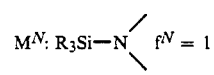

which is considered to be monofunctional;

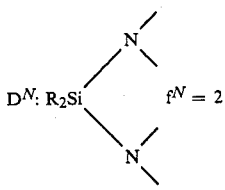

which is considered to be difunctional;

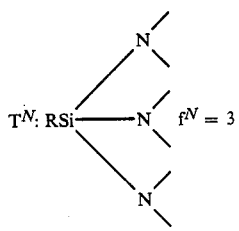

which is considered to be trifunctional; and

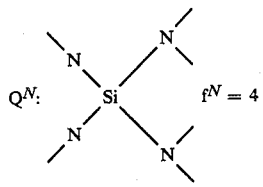

which is considered to be tetrafunctional.

The starting aminolysates are generally in the form of a liquid with a low or high viscosity, or even in the form of a paste, ranging as far as the solid state. Now, these aminolysates generally include a proportion, which may be high, of low molecular mass species that can be eliminated during the pyrolysis. As a result, the weight yield of the ceramic product, based on the starting material, is correspondingly reduced.

In addition, these aminolysates, especially in the case where they contain a high proportion of difunctional silicon, for example $D^N$, are not sufficiently stable thermally during the pyrolysis. They decompose, owing to the rupture of the Si—NH or Si—N bonds, to give rise to volatile oligomers that correspondingly reduce the weight yield of the ceramic product based on the starting material.

In a wholly unexpected manner, the process of the invention comprising an acid-catalysis treatment makes it possible, on the one hand, to incorporate the volatiles in the macromolecules of the aminolysate and, on the other hand, in the presence of trifunctional silicon-containing units, for example $T^N$, to rearrange and to super-crosslink the aminolysate lattice. As a result of this rearrangement or crosslinking, the aminolysate lattice is more thermally stable during the pyrolysis. Thus, depending on the nature of the starting aminolysate, the catalytic treatment of the invention gives rise to a polymerization and/or a copolymerization and/or a molecular rearrangement. Another highly important advantage stemming from the acid treatment according to the invention is the production of a treated aminolysate that is more resistant to oxygen and atmospheric moisture.

In accordance with the present invention, the catalyst used in the catalytic treatment of the polysilazane is a strong acid catalyst. The strong acid may be an inorganic or organic acid. The catalyst is generally used in a concentration of from 1 ppm to 10,000 ppm of a strong acid based on the starting polysilazane and, preferably, from 10 ppm to 5,000 ppm. The polymerization temperature ranges from an ambient temperature of 20° C. to 180° C. and, preferably, from 120° C. to 160° C.

The reaction may be carried out in bulk, which represents a clear advantages. However, an organic solvent, such as toluene, methylene chloride, benzene, xylene, hexane, heptane, and the like, may be used. The reaction may be carried out at atmospheric pressure, under pressure, or under reduced pressure. Naturally, the reaction time is a function of the catalyst concentration and the reaction temperature. At a temperature from 120° C. to 160° C. and an acid concentration from 10 ppm to 5,000 ppm, the polymerization time is advantageously from 30 minutes to 30 hours.

According to the invention, a strong organic or inorganic acid means any acid that has a $pK_a$ value of less than 5 in water in the case of its most acidic hydrogen atom. More particularly, representative strong acids that can be used are trifluoro-methanesulphonic, perchloric, trichloromethanesulphonic, hydro-chloric, acetic, nitric, picric, pyrophosphoric, chromic, p-toluenesulphonic and chloroplatinic acids.

The term strong organic or inorganic acid also includes the ion exchange resins containing strong acid anions that are absorbed or attached to the resins. Examples of these resins are the sulphonated ion exchange resins described, for example, in U.S. Pat. Nos. 3,037,052 and 3,322,722.

Acidic earths such as Tonsil ® or Actisil ®, or montmorillonite washed with sulphuric acid, may also be used as the strong organic or inorganic acid. It is also possible to use as a catalyst Spherosil ® that consists of a porous inorganic substrate coated with a polymeric film carrying sulphonic or phosphonic groups such as, for example, as described in French Pat. No. 2,505,850.

In the coating, film, and thin layer applications, the treated organopolysilazane composition according to the invention is preferably used without solvent. In this case, a viscosity from 10 mPa s to 5,000 mPa s at 25° C., preferably from 100 mPa s to 1,000 mPa s, is chosen.

Higher viscosities may be used. However, when the compositions are to be used for coating or impregnating a substrate, the composition needs to be dissolved in an organic solvent that is compatible with the polysilazanes, such as benzene, toluene, hexane, cyclohexane, isopropyl ether, ethyl ether, dichloromethane and chlorobenzene.

Viscosities greater than 5,000 mPa s should be used in fiber applications. The operation may be carried out without any solvent, in the molten state, or in solution. The crosslinking is produced at the exit of the die by a passage through an oven and/or under irradiation such as UV electron beams.

The polysilazane compositions according to the invention may additionally contain fillers, preferably chosen from $SiO_2$, $Si_3N_4$, SiC, BN, $B_2O_3$, $B_4C$, AlN, $Al_2O_3Al_4C_3$, TiN, $TiO_2$, TiC, $ZrO_2$, ZrC, $VO_2$, and the like. The polysilazane composition according to the invention may also be used as a matrix for ceramic fibers made, in particular, of SiC, SiO$_2$, Si$_3$N$_4$, B$_4$C, and the like.

The polysilazane composition according to the invention is especially useful for coating or impregnating rigid or flexible metal or ceramic fiber substrates. The substrates that are covered or impregnated with the cured composition or the fibers may be immediately or subsequently subjected to a pyrolysis treatment. This pyrolysis preferably occurs under vacuum, under pressure, or under an inert atmosphere, at a temperature ranging from the crosslinking temperature to 1,500°–2,000° C., depending on the required nature of the ceramic or of the binder.

The composition according to the invention therefore makes it possible to produce intermediate semifinished products that can be stored in the open air and that can be subsequently pyrolyzed. Thus, this constitutes a particularly advantageous process for depositing or impregnating a ceramic material onto a substrate and for producing ceramic fibers and sintering binders.

In the following examples, which illustrate the invention without limiting its scope, the polysilazanes obtained, whether treated catalytically or not, are analyzed by thermogravimetric analysis (TGA). The polysilazanes are pyrolyzed at temperatures ranging from ambient temperature (20° C.) to 1,400° C. under nitrogen at a rate of a temperature rise of 2° C./minute. The TGA yield (% by weight of solid residue at 1,300°–1,500° C.) is indicated in the examples.

In the examples, the viscosity is measured at 25° C. and is given in mPa s. In addition, in the formulae, Me=CH$_3$. The ammonolysis and coammonolysis reactions are carried out in a first, three-liter, cylindrical reactor I, which is equipped with a jacket for cooling the reaction space. A gas condenser is mounted above the reactor. Mechanical stirring is provided by two Rushton® turbines arranged along the stirrer shaft, one turbine has straight blades and one turbine has inclined blades.

N$_2$ and NH$_3$ are introduced by means of a narrow tube immersed in the solution so that NH$_3$ is produced just below the first turbine stirrer. When ammonolysis is complete, the reaction mixture is drained off and is introduced into a second reactor II equipped with mechanical stirring (a Rushton ® turbine having straight blades) and a filter bed having a mean porosity of 10 μm.

The ammonolysates are filtered. The solvent washes are then introduced into a third, six-liter reactor III equipped with a jacket and mechanical stirring by means of a straight-bladed Rushton ® turbine, and blanketed with N$_2$ or evacuated to 25 mbar, in which the catalytic treatment is carried out.

The entire unit is filled with an inert atmosphere several hours before the handling. The entire reaction, ammonolysis, filtration, and solvent evaporation takes place under dry nitrogen. The products obtained are placed in leakproof flasks blanketed with nitrogen and are stored, weighed, and handled in a nitrogen-blanketed glove box.

Chemical determination of the SiH groups is performed by reaction with 5% by weight of potassium hydroxide in butanol. A quantity of hydrogen, which is measured by gasometry and is proportional to the quantity of SiH present in the specimen, is released. In comparison, a specimen of D$_3$N (hexamethylcyclotrisilazane) that contains no SiH unit does not give rise to any evolution of hydrogen within the time and temperature range required for the measurement (20° C. for 15 minutes). This measurement establishes that potassium hydroxide does not react with the hydrogens bonded to the nitrogen. The results of the chemical method, which is simple to use, are consistent with the results of semi-quantitative spectroscopic methods, such as $^1$H NMR, $^{29}$Si NMR, and IR.

In addition, the nomenclature used in the following examples

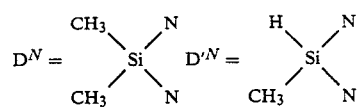

Unless stated otherwise, the following percentages are by weight.

The following are illustrated examples of the present invention. It is understood, however, that the invention is not to be limited to the specific conditions or details set forth in these examples.

EXAMPLE 1

207.5 g of CH$_3$HSiCl$_2$ (1.8 mole) of 99% purity are placed in the reactor I in the presence of 1.2 liters of isopropyl ether. Ammonia is introduced into the reactor I at a rate of 6 cm$^3$/s, together with N$_2$ at a rate of 3 cm$^3$/s for 7 hours 30 minutes. Approximately 7 moles of NH$_3$ are introduced. The temperature of the reactor I is maintained at 2° C. during the addition of NH$_3$ for 6 hours and is raised to 20° C., with NH$_3$ still being added for 1 hour 30 minutes. The ammonium chloride removed is dried under vacuum and weighed to be 188 g compared with a theoretical weight of 192.6 g.

After removal of the solvent under a vacuum of 25 mbar at 60° C., followed by 1.5 mbar at 60° C. for 1 hour, 84 g of a clear, low-viscosity liquid are recovered. The weight yield of the reaction is 79%.

The recovered solvents are analyzed by gas phase chromatography to identify and quantify the proportion of volatiles removed during the volatilization of the product.

The product itself is analyzed by IR, $^{29}$SiNMR and $^1$H proton NMR (360 MHz NMR in C$_6$D$_6$): Δ=0.1–0.4 ppm (broad: SiCH$_3$), Δ=0.6 to 1.5 ppm (broad: NH), Δ=4.1 ppm (broad: SiH), Δ=4.5–4.7 ppm (broad: SiH), Δ=4.8–5.0 ppm (broad: SiH).

Analysis by liquid chromatography indicates the presence of several low molecular mass products estimated at between 300 g and 450 g. Quantitative chemical analysis of the product indicates a hydrogen content in the product=1.66% as opposed to a theoretical yield of 1.70%. This result is consistent with the results given by spectroscopic methods.

EXAMPLE 2

The coammonolysis in accordance with the process of Example 1 is performed with:
107.2 g of CH$_3$SiCl$_3$ (0.72 mole)
46.25 g of (CH$_3$)$_2$SiCl$_2$ (0.36 mole)
41.4 g of CH$_3$HSiCl$_2$ (0.36 mole)
in a solvent medium of 1.3 liters isopropyl ether. The reaction is carried out at 2° C. with an NH$_3$ flowrate of 6 cm$^3$/s for 7 hours so as to use 6.6 moles of NH$_3$.

83 g of a liquid with a viscosity of 1,100 mPa s are recovered. The weight yield of the coammonolysis is 86.2%.

Chemical analysis of the SiH groups shows 0.37% compared to a theoretical 0.38%.

EXAMPLE 3

The polysilazane used is a mixture of hexamethylcyclotrisilazane ($D_3^N$), the principal product formed during the ammonolysis of $Me_2SiCl_2$ and of a hydrogenated polysilazane prepared according to Example 1. The SiH/SiMe molar composition is approximately ⅓.

The mixture is polymerized for 24 hours at 110° C. in the presence of 3,000 ppm of trifluoromethanesulfonic acid. The polymer yield (PY*) measured by microdevolatilization is 80%. The polymer isolated in this manner is analyzed by TGA and gives an 81% yield of inorganic product.

The polymer yield (PY*) is measured by adding approximately 2 g, weighed precisely, of the product to a beaker handled under dry $N_2$. The product in the beaker is heated to 175° C. for 2 hours under a reduced pressure of 1.3 mbar. After cooling, the beaker is weighed, and this enables the polymer yield to be determined.

EXAMPLES 4 TO 11

The method used in Example 3 is repeated, but using the polysilazane prepared according to Example 1 as a monomer. The results obtained under different conditions of catalysis such as nature of the catalyst, catalyst concentration, temperature, and time, are shown in Table I below:

TABLE I

| Example | Catalyst | Catalyst concentration ppm | T° C. | Time hours/min | | PY % | TGA % |
|---|---|---|---|---|---|---|---|
| 4 | $CF_3SO_3H$ | 4,500 | 155 | 3 | 00 | 98 | 80 |
| 5 | $CF_3SO_3H$ | 4,500 | 20 | 6 | 00 | 86 | 95 |
| 6 | $CF_3COOH$ | 3,400 | 155 | 3 | 00 | 99 | 72 |
| 7 | $CF_3COOH$ | 340 | 140 | 5 | 00 | 73 | 68 |
| 8 | $HClO_4$ | 3,000 | 155 | 3 | 00 | 99 | 70 |
| 9 | $CCl_3COOH$ | 4,900 | 155 | 3 | 00 | 94 | 69 |
| 10 | $H_2SO_4$ | 2,900 | 155 | 2 | 45 | 94 | 90 |
| 11 | $CH_3COOH$ | 3,000 | 140 | 5 | 00 | 74 | 70 |

EXAMPLES 12

The method used in Examples 4 to 11 is repeated, except that the homogeneous catalyst is replaced by a hydrochloride clay (Tonsil ®), having an acidity of 0.6 meq $H^+g^{-1}$. The results are provided in Table II below:

TABLE II

| Example | Catalyst | Catalyst concentration ppm | T° C. | Time hours/min | | PY % | TGA % |
|---|---|---|---|---|---|---|---|
| 12 | Tonsil ® | 20 | 155 | 2 | 00 | 84 | 95 |

EXAMPLE 13 AND COMPARATIVE EXAMPLE 13 C

In this Example 13, an acidic rearrangement of the coammonolysate of $MeSiCl_3$, $Me_2SiCl_2$ and $MeHSiCl_2$, prepared according to Example 2, is carried out. The test conditions and results are shown in Table III below:

TABLE III

| Example | Catalyst | Catalyst concentration ppm | T° C. | Time hours/min | | PY % | TGA % |
|---|---|---|---|---|---|---|---|
| 2 | — | — | — | — | | 74 | 29 |
| 13 C | — | — | 170 | 24 | 00 | 82 | 49 |
| 13 | $CF_3SO_3H$ | 3,675 | 120 | 5 | 00 | 99 | 90 |

COMPARATIVE EXAMPLES 14 C AND 15 C:

The principal product $D_3^N$ formed during the ammonolysis of $Me_2SiCl_2$ is used as a polysilazane. A catalytic treatment, which is the same as that described in Example 3, is carried out, and the results are collated in Table IV below:

TABLE IV

| Example | Catalyst | Catalyst concentration ppm | T° C. | Time hours/min | | PY % | TGA % |
|---|---|---|---|---|---|---|---|
| 14 C | $CF_3SO_3H$ | 300 | 165 | 18 | 00 | 57 | 7 |
| 15 C | $CF_3SO_3H$ | 4,500 | 170 | 24 | 00 | 99 | 8 |

While particular embodiments of the invention have been described, it will be understood that the invention is not so limited since many modifications and variations could be made without departing from the spirit or scope of the invention.

What is claimed is:

1. A process for the catalytic treatment of a polysilazane aminolysate, comprising the step of:

catalytically treating at least one polysilazane aminolysate with a catalytically effective amount of a strong acid catalyst to polymerize, copolymerize or molecularly rear-range said aminolysate at the silicon atom, the polysilazane containing on average at least two ≡SiH groups per molecule and the other organic radicals in the polysilazane that are bonded to the silicon or nitrogen atoms being hydrocarbon radicals free from alkene or alkyne unsaturation, the acid being used in proportion of from 1 ppm to 10,000 ppm relative to the weight of the starting polysilazane aminolysate and the polymerization temperature being from 20° C. to 180° C.

2. The process according to claim 1, wherein the treatment is carried out in bulk.

3. The process according to claim 1, wherein the treatment is carried out in an organic solvent solution.

4. The process according to claim 1, wherein the polymerization reaction time is from 30 minutes to 30 hours.

5. The process according to claim 1, wherein the treatment is carried out at atmospheric pressure.

6. The process according to claim 1, wherein the treatment is carried out at a pressure greater than atmospheric pressure.

7. The process according to claim 1, wherein the treatment is carried out under a vacuum.

8. The process according to claim 1, wherein the polymerization temperature is from 120° to 160°.

9. The process according to claim 1, wherein the acid catalyst has a $pk_a$ value of less than 5.

10. The process according to claim 1, wherein the acid catalyst is an organic acid.

11. The process according to claim 1, wherein the acid catalyst is an inorganic acid.

12. The process according to claim 1, wherein the strong acid catalyst is selected from the group consisting of trifluoromethane sulphonic, perchloric, trichloromethane sulphonic, hydrochloric, acetic, nitric, picric, pyrophosphonic, chromic, p-toluenesulphonic, and chloroplatinic acid.

13. The process according to claim 1, wherein the strong acid catalyst is selected from the group consisting of ion exchange resins containing strong acid anions, acid earths, montmorillonite washed with sulphuric acid, and porous inorganic substrates coated with a polymeric film carrying sulphuric or phosphonic acid groups.

14. The process according to claim 1, wherein the polysilazane has a viscosity from 10 mPa s to 5,000 mPa s at 25° C.

15. The process according to claim 14, wherein the viscosity is from 100 mPa s to 1,000 mPa s.

16. The process according to claim 1, wherein the polysilazane has at least three $\equiv$SiH groups per molecule.

17. The process according to claim 1, wherein the strong acid catalyst is selected from the group consisting of $CF_3SO_3CH_3$, $CF_3SO_3H$, $CF_3COOH$, $HClO_4$, $CCl_3COOH$, $H_2SO_4$, and $CH_3COOH$.

18. The process according to claim 1, wherein the strong acid catalyst is used in proportions of from 20 ppm to 4900 ppm relative to the weight of the starting polysilazane.

19. A polysilazane produced by the process of claim 1.

* * * * *